UNITED STATES PATENT OFFICE.

GEORGE S. EVANS, OF NEW YORK, N. Y.

PLASTIC COMPOUND AND VULCANITE.

SPECIFICATION forming part of Letters Patent No. 256,471, dated April 18, 1882.

Application filed March 9, 1882. (No specimens.)

*To all whom it may concern:*

Be it known that I, GEORGE S. EVANS, a citizen of the United States, residing at New York, in the county of New York and State of New York, have invented certain new and useful Improvements in Plastic Compounds and Vulcanites, of which the following is a specification.

The object of my invention is to produce an improved vulcanized plastic compound suitable for electric insulating purposes and for application as a water-repellent coating to fabrics, and applicable generally to all purposes for which plastic materials are used in the arts.

My invention consists in treating caoutchouc and gums—such as gum-kauri and gum-manilla—with palm-oil, cocoanut-oil, or other non-siccative oil, and vulcanizing the product, in the manner hereinafter described.

The following is a description of my process: I take one hundred parts of palm-oil, cocoanut-oil, or other non-siccative oil and heat it to a temperature above 212° Fahrenheit, and then add about twenty-three parts of caoutchouc, preferably cut into small pieces to facilitate its solution in the oil. The heat is continued until the caoutchouc is completely dissolved, the mixture being stirred meanwhile to hasten this result. The temperature employed may be greatly varied, but should not be allowed to reach the decomposing-point of the caoutchouc. When the caoutchouc has become completely dissolved a resinous gum—such as gum-kauri or gum-manilla—in a powdered condition and equal in quantity to the mixture of oil and caoutchouc, is slowly added to the mixture, a continued stirring being maintained for the purpose of mixing the mass thoroughly and rapidly. If desired, the gum, instead of being thrown in dry, may be separately mixed with the oil, and in this condition added to the solution of oil and caoutchouc; or the gum may first be mixed with the full quantity of oil and the caoutchouc dissolved in this mixture. In either case about the proportions given above should be maintained.

I find it advisable for the above operation to employ a temperature in the neighborhood of 350° Fahrenheit.

When the above operation has been continued until the liquid ceases to froth and presents a clear and limpid appearance, the temperature may be allowed to fall to about 270° or 280° Fahrenheit, although this is not absolutely necessary. The molten mass is then poured or otherwise incorporated with about from five to fifteen per cent. (depending upon the degree of vulcanization desired) of chloride of magnesium or such other of the chlorides of the earthy alkalies as will answer the purpose—for example, chloride of aluminium, as described in my application for Letters Patent of the United States filed September, 1881. The mass is allowed to remain at a high and uniform temperature for several hours to complete the vulcanization, and the product is improved by permitting this heat to continue for as much as twenty-four hours. At the expiration of the time allowed the mass is washed several times in hot water to remove the free chloride, and finally heated to a point below the decomposing-point of caoutchouc, to expel whatever water it may contain. The product is then ready for use in the several arts, as above stated.

What I claim as new, and desire to secure by Letters Patent, is—

1. The process of producing a solution of caoutchouc for incorporation into plastic compounds, which consists in mixing the caoutchouc with palm-oil or analogous non-siccative oil in a heated condition, substantially as and in the proportions described.

2. The process of producing a plastic compound suitable for vulcanization, which consists in mixing caoutchouc with palm-oil or analogous non-siccative oil in a heated state, and then adding to the mixture a resinous gum, substantially as described.

3. The process of vulcanizing plastic compounds, which consists in incorporating with such plastic compound chloride of magnesium or other suitable chloride of the earthy alkalies, substantially as and in the proportions set forth.

4. A composition for incorporation into plastic compounds, consisting of a solution of caoutchouc and palm-oil or analogous non-siccative oil, substantially as and in the proportions described.

5. A plastic composition suitable for vulcanization, consisting of caoutchouc, palm-oil or analogous non-siccative oil, and a resinous gum, substantially as and in the proportion described.

6. The plastic composition herein described, suitable for electric insulation, water-proof coating, &c., the same consisting of caoutchouc, palm-oil or analogous non-siccative oil, and resinous gum, mixed together and subsequently vulcanized, substantially as described.

In testimony whereof I affix my signature in presence of two witnesses.

GEO. S. EVANS.

Witnesses:
ANNIE M. PETERS,
EBENEZER ELLIS.